US008341254B2

(12) United States Patent
Devarakonda et al.

(10) Patent No.: US 8,341,254 B2
(45) Date of Patent: Dec. 25, 2012

(54) MIDDLEWARE-DRIVEN SERVER DISCOVERY

(75) Inventors: Murthy V. Devarakonda, Hawthorne, NY (US); Nikolai A. Joukov, Hawthorne, NY (US); Konstantinos Magoutis, Heraklion (GR); Norbert G. Vogl, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/702,820

(22) Filed: Feb. 9, 2010

(65) Prior Publication Data

US 2011/0196959 A1    Aug. 11, 2011

(51) Int. Cl.
 *G06F 15/173*    (2006.01)
(52) U.S. Cl. ......... 709/223; 709/203; 709/217; 709/224
(58) Field of Classification Search .................. 709/223, 709/224, 203, 217, 219
 See application file for complete search history.

(56) References Cited

U.S. PATENT DOCUMENTS

| 7,490,293 | B1* | 2/2009 | Humpleman et al. | 715/734 |
|---|---|---|---|---|
| 8,214,882 | B2* | 7/2012 | Kegel et al. | 726/3 |
| 2007/0002767 | A1* | 1/2007 | Holman et al. | 370/255 |
| 2008/0244063 | A1* | 10/2008 | Risbud | 709/224 |
| 2008/0307054 | A1* | 12/2008 | Kamarthy et al. | 709/206 |
| 2009/0276520 | A1* | 11/2009 | Weerakoon et al. | 709/224 |
| 2010/0064226 | A1* | 3/2010 | Stefaniak et al. | 715/736 |
| 2010/0070563 | A1* | 3/2010 | Baker et al. | 709/203 |

OTHER PUBLICATIONS

Fyodor, "The Art of Port Scanning", Phrack Magazine, Sep. 1, 1997, vol. 7, Issue 51.
Rich, C.R., "TADDM'S Flexible Approach to Discovery" The Tivoli Advisor, Technical Report, Oct. 12, 2007.
U.S. Appl. No. 12/485,345 entitled, "Process and System for Comprehensive IT Discovery Without Credentials" filed Jun. 16, 2009, First Named Inventor: Louis E. Aiken.
Chen, X., et al., "Automated Network Application Dependency Discovery: Experiences, Limitations, and New Solutions", OSDI 200, OSDI 2008, pp. 117-130.
Bowker, M., et al. "ESG Lab Validation Report, EMC Smarts Application Discovery Manager Automated Infrastructure Discovery", A validation study by ESG Lab Jul. 2007.
Kumar, R., "A Message From Data Center Managers to CIOs: Floor Space, Power and Cooling Will Limit Our Growth", Gartner RAS Core Research note G00142393, Aug. 21, 2006, R1617 03302007.
Joukov, N. et al., "Built-to-Order Service Engineering for Enterprise IT Discovery" Proceedings of the IEEE International Conference on Services Computing (SCC 2008) Jul. 2008, pp. 91-98, vol. 2.
Kashima, H. et al., "Network-based Problem Detection for Distributed Systems", Proceedings of the 21st International Conference on Data Engineering (ICDE 2005), Apr. 2005, pp. 978-979.
Magoutis, K. et al., "Galapagos: Model-driven discovery of end-to-end application storage relationships in distributed systems" IBM Journal of Research and Development, Apr. 10, 2008, pp. 367-378, vol. 52, Allen Press, Inc.

* cited by examiner

*Primary Examiner* — Lashonda Jacobs
(74) *Attorney, Agent, or Firm* — Scully, Scott, Murphy & Presser, P.C.; Louis J. Percello, Esq.

(57) ABSTRACT

The present invention describes a method and system for discovering of server devices. The system and method receive a list of known server devices. The system and method obtain middleware configuration data and/or log files for each of the known server devices in the list. The system and method derives dependencies on at least one other server device from the middleware configuration data and/or log files. The system and method determines whether the at least one other server device is a new server device not included in the list. Thus, the system and method discovers the new server device upon determining that the at least one other server device is not included in the list.

24 Claims, 5 Drawing Sheets

MIDDLEWARE-DRIVEN SERVER DISCOVERY

BACKGROUND

The present invention generally relates to IT optimization. More particularly, the present invention relates to server device discovery.

Today enterprises are increasingly forced to optimize their IT environments mostly due to power supply, floor space, or cooling capacity problems. Enterprises already have complex and large IT environments usually consisting of many small, medium, and large datacenters. Therefore, any large-scale IT optimization task (i.e., a process for assessing IT infrastructures and platforms across IT capabilities to achieve more dynamic and efficient IT environment) requires information about a current situation: existing datacenters, servers devices running the datacenters, roles of server devices, and details about software components and middleware stacks installed on the server devices. Traditionally, such information is only available as manually maintained spreadsheets that are not accurate. Furthermore, current automated server discovery tools (e.g., a freeware Nmap (Network Mapper)) either do not discover server devices located behind firewalls and server devices that are idle or require long periods of constant network monitoring or both. Fyodor, "The art of port scanning", published in Phrack Magazine, volume 7, Issue 51, on Sep. 1, 1997, wholly incorporated by reference as if fully set forth herein, describes the Nmap in detail. As a result it is not uncommon at server discovery stage to miss one or more datacenters because users performing the discovery did not know that those datacenters exist.

Enterprise IT discovery process is a multi-step process that usually starts with server device and network discovery, is followed by basic middleware and general software discovery, detailed software configuration discovery, and finally business-level roles of servers, software, and data discovery.

Current automated server discovery tools either rely on sending out probing requests and detecting server existence based on replies or they rely on observing network traffic. Unfortunately, sending out probing requests limits a scope of discovery: packets sent outside of current sub-network commonly trigger intrusion detection systems and also usually cannot reach sub-networks behind firewalls. Observing existing network connections over a period of time discovers server devices that are on the same or other networks as long as there are live communications between them. Unfortunately, such discovery requires network connection monitoring over a long period of time: many server devices such as database server devices replicate their data once a week or even once a month and otherwise do not communicate at all. Realistically, it is rarely possible to wait for several months to perform just a server discovery. Furthermore, some servers such as web servers servicing static contents or application servers that process external information do not communicate with any other servers at all if configured for taking over primary servers in case of disasters affecting the primary servers. Similarly, many running servers in an enterprise are idle simply because nobody uses and needs them anymore.

SUMMARY OF THE INVENTION

The present invention describes a system and method for discovering unknown server devices potentially behind firewalls in remote sub-networks without relying on active communications between server devices or monitoring of server devices, e.g., by utilizing middleware configuration data or log files.

In one embodiment, there is provided a computer-implemented method for discovering server devices, the method comprising:

receiving a list of known server devices connected to a network;

obtaining middleware configuration data for each of the known server devices;

deriving dependencies on at least one other server device from the obtained middleware configuration data; and determining whether the at least one other server device is a new server device that is not included in the list, and characterizing the at least one other server device as the new server device if not in the list.

wherein the at least one other server device is determined as the new server device if the at least one other server device is not in the list.

In one embodiment, there is provided a computer-implemented system for discovering server devices, the system comprising:

a memory device; and a processor unit in communication with the memory device, the processor unit performing steps of:

receiving a list of known server devices connected to a network;

obtaining middleware configuration data for each of the known server devices;

deriving dependencies on at least one other server device from the obtained middleware configuration data; and determining whether the at least one other server device is a new server device that is not included in the list, and characterizing the at least one other server device as the new server device if not in the list.

In a further embodiment, the processor unit requires no extra monitoring of the known server devices and does not rely on active network communications between server devices when performing the steps of the receiving, the obtaining, the deriving, the determining and the acquiring.

In a further embodiment, the new server device is located behind a firewall in a remote sub-network.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
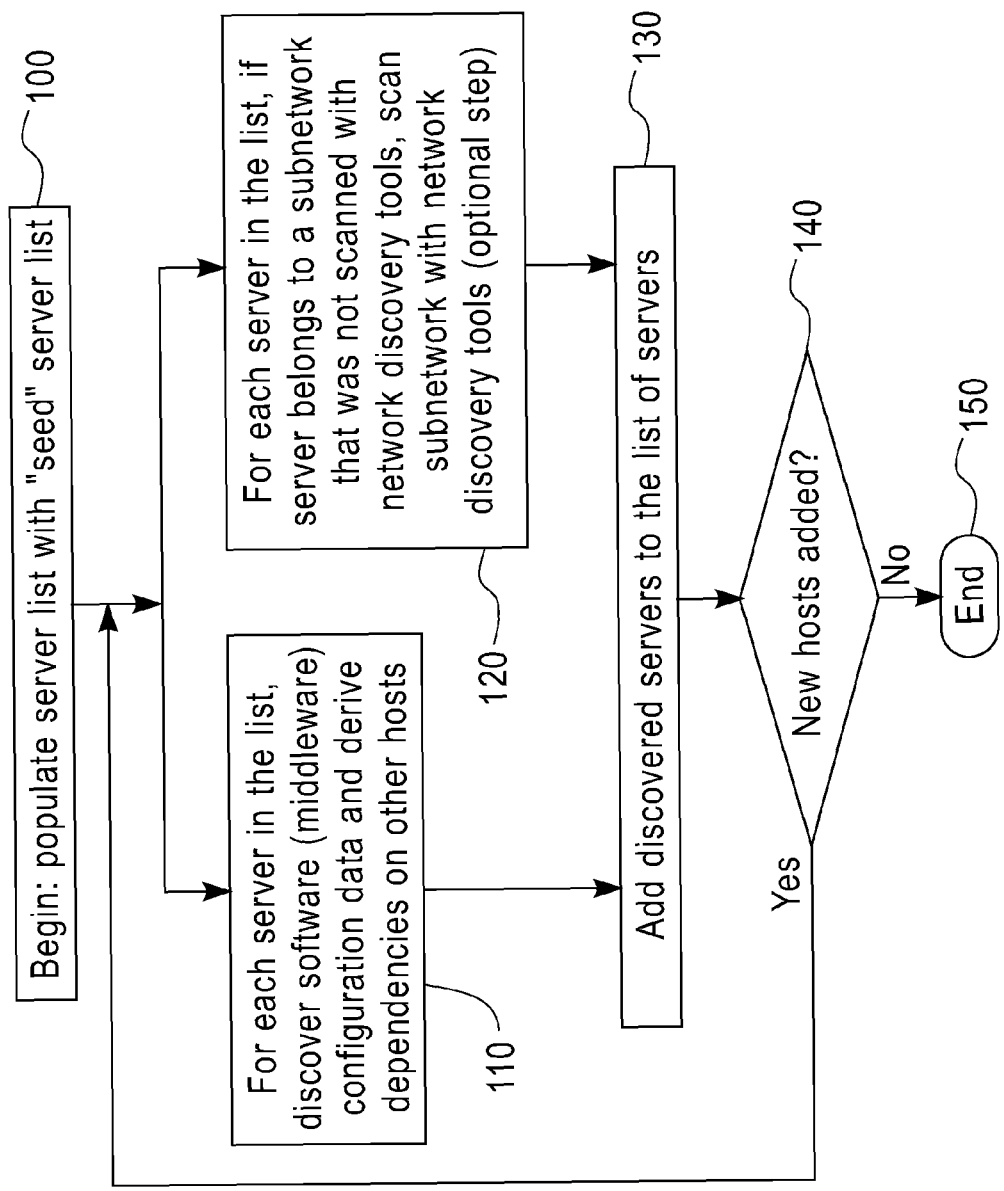
FIG. 1 illustrates a flow chart describing method steps for discovering of server devices according to one embodiment of the present invention.

Network scanning tools (e.g., a freeware Nmap) can only discover server devices within a range they are configured to discover. The network scanning tools that monitor active network connections only detect server devices that participated in communications with known server devices only during a limited time of performing the discovery.

Server devices in datacenters operate various applications that rely on sophisticated middleware. These applications and middleware have configuration files that describe all possible system behaviors including system behaviors that only happen rarely or never happened in the past at all. For example, IBM® WebSphere® Application Servers have plug-in configuration files for front-end web servers. These plug-in configuration files include information about stand-by application servers that are not used during normal datacenter operation. For example, modern databases (e.g., IBM® DB2®) can replicate their data periodically. Even if a user does not observe a corresponding network connection associated with a database, database configuration files (e.g., DB2® configuration file) include enough information about where and when the data gets replicated.

Configuration files include information about past network connections, ongoing network connections and possible future network connections. Middleware and applications frequently maintain logs of activity that include information about incoming network connections that happened in the past. For example, high-performance http server devices and proxy server devices frequently store log files that include information about daily activities and even include information about activities for a year. Processing of these logs or log files can reveal edge servers that are normally located in different sub-networks than web and application servers. The edge server may handle all email flows and provide message protection and security for the emails.

According to one embodiment of the present invention, a discovery manager (e.g., discovery manager 220 in FIG. 2) discovers server devices based on middleware configuration data and log files. For example, if a database on a first server device is configured to replicate its data with another database on a second server device, the discovery manager 220 concludes with a high probability that the second server device exists. This method (i.e., a method for discovering server devices based on middleware configuration data and log files) has a number of benefits, including but not limited to: 1) the discovery manager 220 detects a server device presence even if there are no "live" connections (i.e., a network communication happening over a network) between server devices for long periods of time. If a server device A has a configuration file that includes information about a server device B, the discovery manager 220 can expect that the server device B exists even if there is no connection between the server device A and the server device B; 2) Sever device discovery performed by the discovery manager 220 is transparent for firewalls and physical distances between the sever devices (i.e., the discovery manager 220 can discover server devices located behind firewalls and physically far away by utilizing the middleware configuration data and log files). For example, past, current and future server connections described in the configuration data or log files inform the discovery manager 220 of a name of a discovered server, a network address of the discovered server and a physical location of the discovered server; and 3) this method can be efficiently combined with system configuration discovery tools and thus requires no special credentials on the network and precautions about triggering intrusion detection systems. The system configuration discovery tool refers to a tool collecting information about configuration of a server device. IBM® Tivoli® Application Dependencies Discovery Manager (TADDM) is an example of the system configuration discovery tool.

Middleware configuration data and log files include information about server devices that a given middleware connects to or monitors connections from. For example, IBM® WebSphere® Application Server (WAS) can be configured to use IBM® WebSphere® MQ servers (WMQ). Therefore, once the discovery manager 220 obtains WAS configuration files, the discovery manager 220 infers with high probability that a WMQ server exists. Then, the discovery manager 220 can request configuration files of the WMQ server and discover its dependencies in turn: discover that the WMQ server does not exist and there is a mis-configuration of the WAS, or confirm that the WMQ server exists. The discovery manager 220 can use information about incoming network connections (e.g., extracted from log files) in a similar way.

The discovery manager 220 starts from a "seed" list of servers, discovers dependencies of middleware installed on these servers based on the middleware configuration data or log files, and repeats discovering dependencies on dependent servers. The dependent server refers to a discovered server during a previous discovery process. The seed list of servers refers to a list of known existing server devices in an enterprise network. The seed list can be obtained from existing document(s) or by querying system administrators who manage enterprise server devices. The discovery manager 220 can discover servers located behind firewalls without sending any probe requests or credentials on network infrastructure nodes and without monitoring network traffic, because the middleware configuration data or log files include information about server connections that existed in the past, exists currently or may be created in the future. Such past, current and future connections described in the configuration data or log files can further inform the discovery manager 220 of a name of a discovered server, a network address of the discovered server and a physical location of the discovered server. The server or server device refers to any hardware computing device (e.g., IBM™ System x™ enterprise server, desktop, laptop, or netbook) providing a service to other computing device(s) and/or software (e.g., Apache Web Server) serving other applications.

Figure 4:
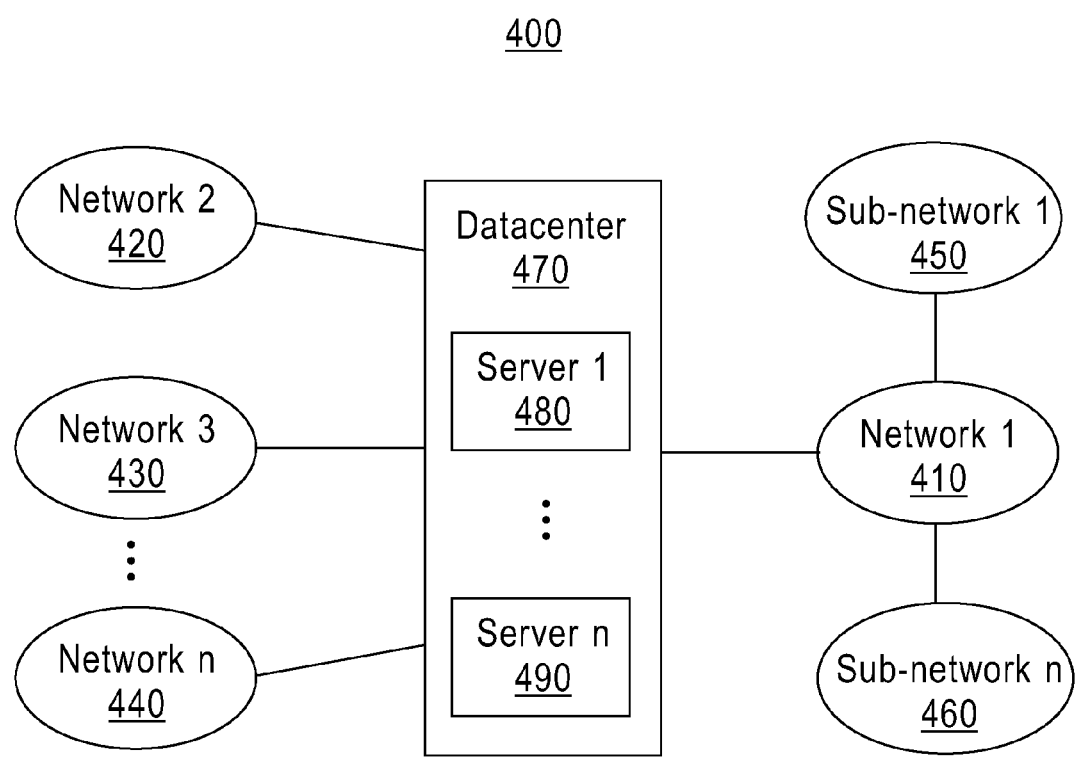
FIG. 4 illustrates an exemplary environment including a plurality of networks, a plurality of sub-networks, a datacenter and a plurality of servers where one embodiment of the present invention is implemented.

FIG. 4 illustrates an exemplary environment where one embodiment of the present invention is implemented. The environment 400 includes, but is not limited to: at least one datacenter 470, a plurality of networks (e.g., a network 1 (420), a network 2 (410), a network 3 (430), a network n (440)), a plurality of sub-networks (e.g., a sub-network 1 (450), a sub-network n (460)), that are part of one or more of the plurality of networks. The datacenter may include a plurality of server devices (e.g., a web server device 1 (480), a database server device n (490)). Each network may also include a plurality of server devices (not shown). Each sub-network may also include a plurality of server devices (not shown). Any server device in the datacenter, in a network or in a sub-network can be a host device implementing the discovery manager 220.

Figure 2:
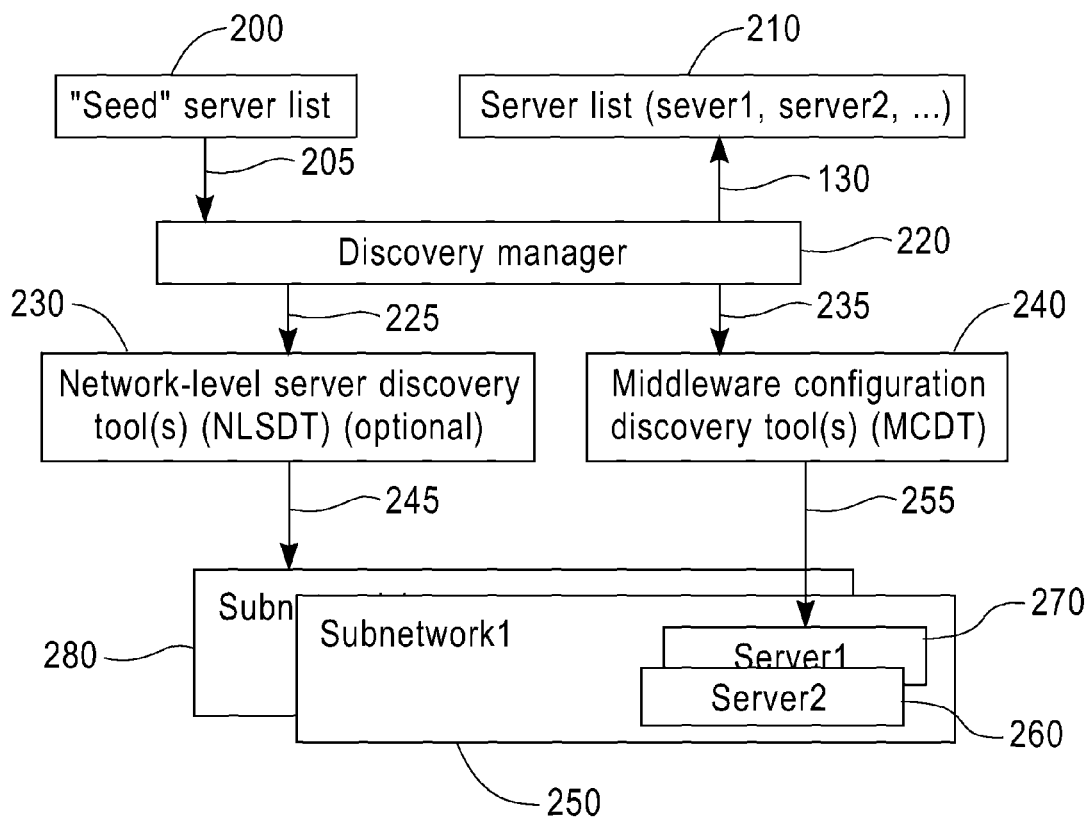
FIG. 2 illustrates a system diagram for discovering of server devices according to one embodiment of the present invention.

FIG. 1 illustrates a flow chart describing method steps for discovering server devices according to one embodiment of the present invention. FIG. 2 illustrates a system diagram depicting software or hardware component(s) running the method steps according to one embodiment of the present invention. Referring to FIG. 1, at step 100, the discovery manager 220 receives 205 a seed list 200 of known server devices, and copies this seed list 200 to the list 210 of known servers. At step 110, the discovery manager 220 invokes 235 a middleware configuration discovery tool (MCDT) 240 (e.g., IBM® TADDM). Charles Rich, "TADDM's Flexible Approaching to Discovery", IBM® Technical Report, IBM® Corporation, July 2007, wholly incorporated as reference by reference as if fully set forth herein, describes the IBM® TADDM in detail. The MCDT 240 collects information about middleware configurations of the known server devices in the list 210. For example, the MCDT 240 discovers parameters of a database installation in the known server devices in the list 210. Middleware includes, but is not limited to, software that connects software components or applications. For each server in the list 210, the MCDT 240 obtains middleware and/or software configuration data or log files and derives dependencies (e.g., connections) 255 on at least one other server device (e.g., a server 1 (270) and/or a server 2 (260) in a sub-network 1 (250)) from the middleware configuration data or log files. Middleware configuration data can also be obtained with agents (e.g., IBM® TADDM) that require credentials on the servers or without credentials. A co-pending and co-assigned US patent application (U.S. patent application Ser. No. 12/485,345 (hereinafter "Aiken"), wholly incorporated by reference as if fully set forth herein, describes acquiring middleware/software configuration and log files without requiring extra credentials or extra monitoring on server devices. Aiken describes implementing the following: a discovery team (i.e., users who need to perform discovering dependencies, configurations and utilizations among IT resources in an enterprise) writes a prediscovery script without requesting credentials, sends the prediscovery script to a system administrator who already has necessary credentials to run the prediscovery script on a target server; While or after running the prediscovery script, the target server generates a result of the running of the prediscovery script and provides the result to an analysis system; The analysis system analyzes and parses the result and generates a user-friendly data (e.g., graph or spreadsheet) or machine-readable form (e.g., a bar code) that represents dependencies, configurations and utilization of IT resources associated with the target server.

The middleware configuration data and log files associated with a sever device includes software configuration data and log files associated with the server device. Based on the configuration data and log files including information about server device connections that exist currently, existed in the past and/or may be created in the future, the MCDT 240 derives 255 dependencies on the at least one other server devices (server 1 270 or server 2 260). Configuration files include information about outgoing dependencies. Program files themselves may include configuration data specified directly in the program code. Such configuration data inside of the program files should also be considered middleware configuration data too. Log files maintained by middleware and applications include information about incoming dependencies (e.g., incoming network connections) that happed in the past. The information about the past, current and future server device connections also describe names, physical locations and network addresses of the at least one other server devices.

Then, the discovery manager 220 determines whether the at least one other server device is a new server device not included in the list 210. If the at least one other server device is not included in the list 210, the discovery manager 220 optionally performs informing a user that the at least one other server device is a newly discovered server device, e.g., by sending an email (not shown). The discovery manager 220 characterizes the at least one other server device as the new server device if the at least one other server device is not in the list 210. At step 130, the discovery manager 220 adds the new server device to the list 210.

At an optional step 120, for each server device in the list 210, if a server device belongs to a sub-network (e.g., a sub-network 2 (280)) that was not scanned with a network-level sever discovery tool (NLSDT) 230, the discovery manager 220 invokes 225 the NLDST 230 to scan the sub-network. Alternatively, the NLDST 230 scans each sub-network that each of the server devices in the list 210 belongs to. This scanning may discover 245 new server device(s) behind a firewall in a remote sub-network or new sub-network(s) including undiscovered server device(s). The NLSDT 230 performs monitoring network traffic or sending out active server probing packets (i.e., packets being sent to search for server devices in sub-network). Xu Chen, Ming Zhang, Z. Morley Mao and Paramvir Bahl, "Automated Network Application Dependency Discovery: Experiences, Limitations, and New Solutions", OSDI 2008, hereinafter "Orion", wholly incorporated by reference as if fully set forth herein, describes an example of the network-level server discovery tool 230. At step 130 in FIG. 1, the discovery manager 220 adds the new server device(s) to the list 210.

At step 140, if a new server device is added to the list 210, the discovery manager 220 re-runs steps 100-130 for the new server device. Otherwise, the discovery manager 220 completes the server discovery process illustrated in FIG. 1.

Figure 3:
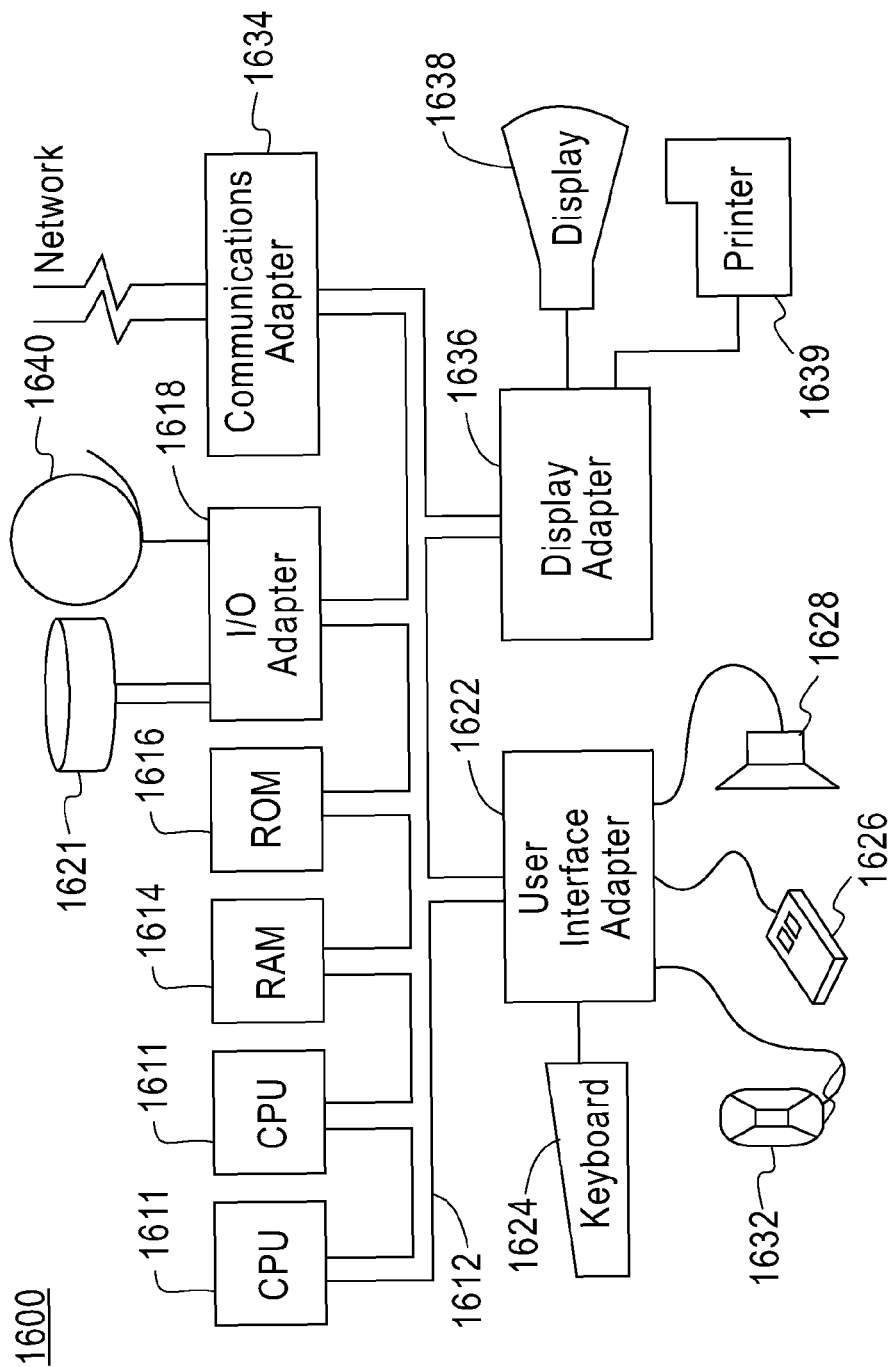
FIG. 3 illustrates an exemplary hardware configuration for discovering of server devices according to one embodiment of the present invention.
Figure 5:
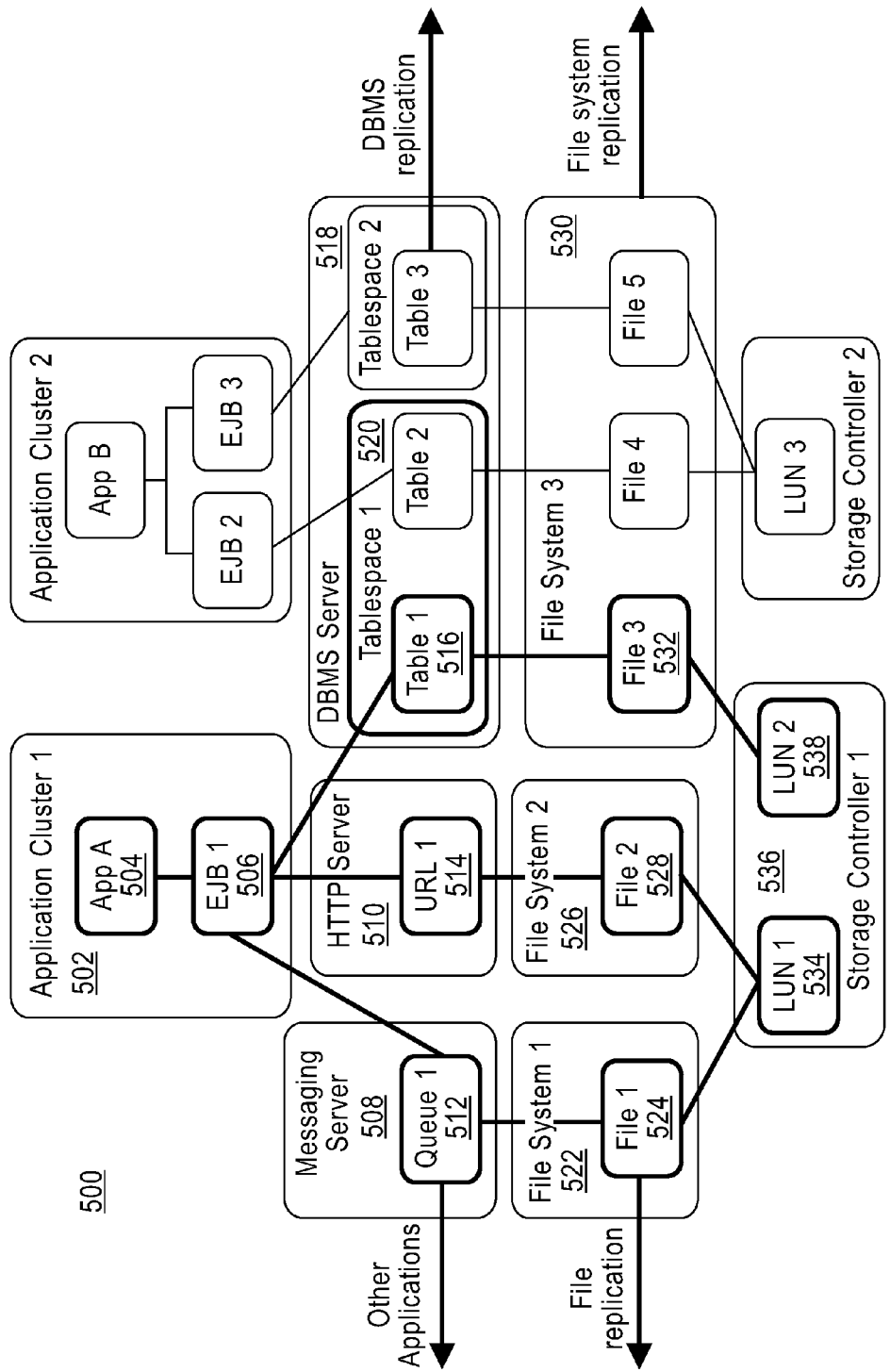
FIG. 5 illustrates exemplary dependencies derived according to one embodiment of the present invention.

FIG. 5 illustrates an example of the dependencies between hardware and software components. According to one embodiment of the present invention, the dependencies are derived from application of the MCDT 240. (FIG. 5 corresponds to FIG. 3 of Aiken.) Though the dependencies shown in the FIG. 5 is a graph, the dependencies can be represented by a text, spreadsheet, table, etc. The following components are in an organization 500: an application cluster 1 (502), an application cluster 2, a messaging server 508, an http server 510, a DBMS server 518, a file system 1 (522), file system 2 (526), a file system 3 (530), a storage controller 1 (536) and a storage controller 2. In one embodiment, FIG. 5 illustrates an example of configuration data of each component in the organization 500. For example, an application cluster 1 (502) includes an application A 504 and an EJB (Enterprise Java-Bean) 1 (506). A storage controller 1 (538) includes LUN (logical storage unit) 1 (534) and LUN 2 (538). In a further embodiment, FIG. 5 illustrates a further example of dependencies among the components. For example, an application A 504 depends on an EJB 1 (506). The EJB 1 (506) depends on a queue 1 (512) in a messaging server 508, a URL 1 (514) in a HTTP server 510 and a table 1 (516) in tablespace 1 (520) in a DBMS server 518. The queue 1 (512) depends on a file 1 (524) in a file system 1 (522). The URL 1 (514) depends on a file 2 (528) in a file system 2 (526). The table 1 (516) depends on a file 3 (532) in the file system 3 (530). The file 1 (524) and file 2 (528) depend on a LUN 1 (534) in the storage controller 1 (536). The file 3 (532) depends on a LUN 2 (538) in the storage controller 1 (536).

In one exemplary application of the server discovery employing the present invention, a majority of servers discovered by utilizing one embodiment of the present invention actually did not have active network connections at the time of discovery. Some of these discovered servers were in completely different sub-networks located as far as half-way around the globe. Such servers (i.e., servers in completely different sub-networks) would not be discovered by traditional server discovery tools unless specifically configured to do so. Most of such servers (i.e., servers in completely different sub-networks) would not be detected by short-time monitoring of network connections. Thus, according to one embodiment of the present invention, the server discovery based on middleware configuration data and log files can significantly outperform traditional server discovery tools.

Most server devices within a remote datacenter may not be directly communicating with known server devices and may not be discovered by traditional server discovery tools. Therefore, the server discovery based on middleware configuration data and log files is useful to provide information that there exists another related sub-network with server devices. To efficiently discover servers in these remote sub-networks, the discovery manager 220 may invoke the NLSDT 230 to search new server devices in these remote sub-networks. For example, if the discovery manager 220 discovers a new server device not included in the list 210, the NLSDT 230 that send out probing packets can discover rest of server device(s) on a same network with the new server device.

In one embodiment, the method steps in FIG. 1 are implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the method steps in FIG. 1 is implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip operates the method steps described in FIG. 1.

In one embodiment, the discovery manager 220, the NLSDT 230 and/or the MCDT 240 are implemented in hardware or reconfigurable hardware, e.g., FPGA or CPLD, using a hardware description language. In another embodiment, the discovery manager 220, the NLSDT 230 and/or the MCDT 240 are implemented in a semiconductor chip, e.g., ASIC, using the semi-custom design methodology.

FIG. 3 illustrates an exemplary hardware configuration of a computing system 1600 running and/or implementing the method steps in FIG. 1. The discovery manager 220, the NLDST 230 and/or the MCDT 240 may also be implemented on the hardware configuration illustrated in FIG. 3. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a local area network (LAN), etc., and a display adapter 1636 for connecting the bus 1612 to a display device 1638 and/or printer 1639 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for discovering server devices, the method comprising:
   receiving a list of known server devices connected to a network;
   obtaining middleware configuration data for each of the known server devices;
   deriving dependencies on at least one other server device from the obtained middleware configuration data; and
   determining whether the at least one other server device is a new server device that is not included in the list, and characterizing the at least one other server device as the new server device if not in the list,
   wherein the receiving, the obtaining, the deriving and the determining and the characterizing do not rely on active network communications between the known server devices during the discovering,
   wherein a processor coupled to a memory device performs steps of: the obtaining, the deriving, the determining and the characterizing.

2. The computer-implemented method according to claim 1, further comprising:
   adding the new server device to the list.

3. The computer-implemented method according to claim 2, further comprising:
   re-running the obtaining, the deriving, the determining and the characterizing upon the adding the new server device to the list.

4. The computer-implemented method according to claim 1, further comprising:
   scanning a sub-network that each of the known server devices belongs.

5. The computer-implemented method according to claim 3, wherein the scanning is performed by a network-level server discovery tool.

6. The computer-implemented method according to claim 5, further comprising:
   discovering a new sub-network including the new server device, wherein the scanning detects the new sub-network.

7. The computer-implemented method according to claim 1, wherein the deriving is performed by a middleware configuration discovery tool.

8. The computer-implemented method according to claim 1, further comprising:
   obtaining at least one middleware log file for each of the known server devices; and
   deriving dependencies on at least one other server device from the obtained at least one middleware log file.

9. The computer-implemented method according to claim 1, wherein the middleware configuration data includes software configuration data in each of the known server device.

10. The computer-implemented method according to claim 1, wherein the new server device is located behind a firewall in a remote sub-network.

11. The computer-implemented method according to claim 1, further comprising one or more of: acquiring a network address of the new server device, acquiring a name of the new server device and acquiring a physical location of the new server device.

12. The computer-implemented method according to claim 1, wherein the receiving, the obtaining, the deriving, the determining and the characterizing require no extra monitoring of the known server devices.

13. A computer-implemented system for discovering server devices, the system comprising:
   a memory device; and
   a processor unit in communication with the memory device, the processor unit performs steps of:
   receiving a list of known server devices connected to a network;
   obtaining middleware configuration data for each of the known server devices;
   deriving dependencies on at least one other server device from the obtained middleware configuration data; and
   determining whether the at least one other server device is a new server device that is not included in the list, and characterizing the at least one other server device as the new server device if not in the list,
   wherein the receiving, the obtaining, the deriving, the determining and the characterizing require do not rely on active network communications between the known server devices during the discovering.

14. The computer-implemented system according to claim 13, wherein the processor unit further performs a step of:
   adding the new server device to the list.

15. The computer-implemented system according to claim 14, wherein the processor unit further performs a step of:
   re-running the obtaining, the deriving, the determining and the characterizing upon the adding the new server device to the list.

16. The computer-implemented system according to claim 13, wherein the processor unit further performs a step of:
   scanning a sub-network that each of the known server devices belongs.

17. The computer-implemented system according to claim 16, wherein the processor unit further performs a step of:
   discovering a new sub-network including the new server device, wherein the scanning detects the new sub-network.

18. The computer-implemented system according to claim 13, wherein the processor unit further performs a step of:
   obtaining at least one middleware log file for each of the known server devices; and
   deriving dependencies on at least one other server device from the obtained at least one middleware log file.

19. The computer-implemented system according to claim 13, wherein the middleware configuration data includes software configuration data in each of the known server device.

20. The computer-implemented system according to claim 13, wherein the new server device is located behind a firewall in a remote sub-network.

21. The computer-implemented system according to claim 13, wherein the processor unit further performs one or more step of:
   obtaining a network address of the new server device;
   obtaining a name of the new server; and
   obtaining a physical location of the new server.

22. The computer-implemented system according to claim 13, wherein the processor unit requires no extra monitoring of the known server devices when performing the steps of the receiving, the obtaining, the deriving, the determining and the characterizing.

23. A computer readable medium embodying computer program instructions being run by a processor for causing a computer to perform method steps for discovering server devices, said method steps comprising the steps of claim 1.

24. A method of deploying a computer program product including programs of instructions in a computer readable medium for discovering server devices, wherein, when the programs of instructions are run by at least one processor, the computer program product performs the steps of claim 1.

* * * * *